(12) United States Patent
Virtanen

(10) Patent No.: US 7,020,108 B2
(45) Date of Patent: Mar. 28, 2006

(54) METHOD FOR PREPARING AN INTERFREQUENCY HANDOVER, A NETWORK ELEMENT AND A MOBILE STATION

(75) Inventor: Anu Virtanen, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 941 days.

(21) Appl. No.: 09/757,917

(22) Filed: Jan. 10, 2001

(65) Prior Publication Data

US 2001/0008521 A1    Jul. 19, 2001

(30) Foreign Application Priority Data

Jan. 10, 2000   (FI) .................................. 20000043

(51) Int. Cl.
*H04Q 7/00* (2006.01)
(52) U.S. Cl. ........................................ 370/331; 455/436
(58) Field of Classification Search ................ 370/331, 370/335, 337, 342; 455/436–443
See application file for complete search history.

(56) References Cited

U.S. PATENT DOCUMENTS

| | | | | |
|---|---|---|---|---|
| 5,533,014 A * | 7/1996 | Willars et al. | ............... | 370/335 |
| 5,883,899 A * | 3/1999 | Dahlman et al. | ............ | 370/468 |
| 5,896,368 A * | 4/1999 | Dahlman et al. | ............ | 370/335 |
| 6,339,590 B1 | 1/2002 | Kim | ........................... | 370/331 |
| 6,469,995 B1 * | 10/2002 | Voyer et al. | ................. | 370/331 |
| 6,498,933 B1 * | 12/2002 | Park et al. | .................. | 455/436 |
| 6,501,744 B1 * | 12/2002 | Alexandre | ................... | 370/335 |
| 6,507,592 B1 * | 1/2003 | Abrol | ......................... | 370/394 |
| 6,532,226 B1 * | 3/2003 | Lehtinen et al. | ............ | 370/347 |
| 6,597,679 B1 * | 7/2003 | Willars | ....................... | 370/342 |
| 6,768,907 B1 * | 7/2004 | Mohebbi | .................... | 455/439 |

FOREIGN PATENT DOCUMENTS

| | | |
|---|---|---|
| EP | 0 984 581 | 3/2000 |
| EP | 0 996 301 | 4/2000 |
| EP | 1081978 | 3/2001 |
| EP | 1081979 | 3/2001 |
| GB | 2331205 | 5/1999 |
| WO | WO 94/29981 | 12/1994 |
| WO | WO 94/30024 | 12/1994 |

(Continued)

OTHER PUBLICATIONS

"Use of Multiple Scrambling Codes in Compressed Mode", TSGR1#7(99)b27, Ericsson, 1999, pp. 6.

(Continued)

*Primary Examiner*—Chi Pham
*Assistant Examiner*—Blanche Wong
(74) *Attorney, Agent, or Firm*—Perman & Green, LLP

(57) ABSTRACT

A method (600) for preparing an interfrequency handover of a certain communication connection from a first frequency to a second frequency features periodically intermitting (603) the transmission/receipt of data on the first frequency for certain transmission gaps. The number of transmission gaps is at least one during each transmission period and a certain sequence of transmission periods (420, 520) is used. Measurements are performed (607) on the second frequency during the transmission gaps on the first frequency. In the step of intermitting the transmission/receipt of data the transmission/receipt of data is intermitted within at least on transmission period for a certain transmission gap (311, 411) having a first duration and for a certain second transmission gap (312, 412) having a second duration. The second duration is different from the first duration. A mobile station (700), a network element (710) and a network control element (720) are also presented.

23 Claims, 5 Drawing Sheets

FOREIGN PATENT DOCUMENTS

Figure 1:
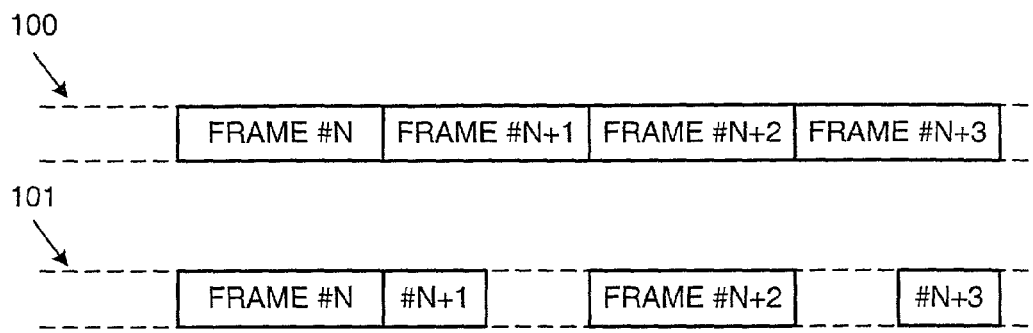

| | | |
|---|---|---|
| WO | WO 97/40593 | 10/1997 |
| WO | WO 01/24566 | 4/2001 |

OTHER PUBLICATIONS

"Physical Layer-Measurements(FDD)", 3G TS25.215, 1999, version 3.0.0.

JP 11-225358—*English equivalent US 6,339,590.

JP 8-500475—** English equivalent WO 94/29981.

"Compressed Mode Techniques for Inter-Frequency in a Wide-band DS-CDMA System", Gustafsson et al., Ericsson Radio Systems AB, 1997 IEEE, pp. 231-235.

* cited by examiner

METHOD FOR PREPARING AN INTERFREQUENCY HANDOVER, A NETWORK ELEMENT AND A MOBILE STATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates in general to handovers in cellular networks. In particular it relates to transmitting data on one frequency and performing measurements on another frequency during or for an interfrequency handover.

(2) Description of Related Art including Information Disclosed Under 37 CFR 1.97 and 1.98.

In cellular networks, where the communication connections are separated from each other using code division multiple access (CDMA) technique, a mobile station having an active communication connection with the cellular network should be able to receive data at the radio frequency related to that communication connection practically all the time. In an interfrequency handover the frequency on which an active communication connection exists is changed. A cell change may accompany the interfrequency handover, in which case the maneuver is an intercell-interfrequency handover, or the frequency change may take place within a single cell meaning that an intracell-interfrequency handover is performed. The present invention is equally applicable to all interfrequency handover types. During an interfrequency handover, a mobile station should be able to receive data on the first frequency and simultaneously to perform measurements and/or receive data on a second frequency.

A mobile station, which has two receivers, may simultaneously listen to two frequencies. For allowing a mobile station, which has only one receiver, to receive data related to the active communication connection uninterruptedly on a first frequency and to receive data also on a second frequency, transmission gaps can be left to the radio transmission on the first frequency. During the transmission gaps, no data is transmitted to the mobile station using the first frequency. Compressed mode transmission refers to a transmitting data in such a way there are breaks (transmission gaps) in the transmission.

Usually data to be transmitted over a radio interface is processed in such a way that the actually transmitted data has more redundancy than the original data. This way it is possible, for example, to detect transmission errors and to recover from them. Especially when the data to be transmitted is related to a real-time application, it may be desirable to transmit the user data at an unchanged data rate even during a compressed mode transmission. In this case a compromise usually has to be made for ensuring, on the one hand, the quality of the transmitted data and, on the other hand, enough time for listening to radio transmission on a second frequency.

Typically data is transmitted over the radio interface in frames, which have a certain number of time slots. The time slots comprise a certain number of symbols. The number of time slots in a frame, the number of symbols in a time slot and the duration of a symbol are usually defined in the applicable cellular system specifications. For example, the Universal Terrestrial Radio Access network (UTRA) of the Universal Mobile Telecommunication System (UMTS) employs 15 time slots in each frame in the UTRA Frequency Division Duplex (FDD) system. UTRA FDD employs CDMA technique.

FIG. 1 illustrates a sequence 100 of frames during a continuous mode transmission. The frames follow immediately each other in time. Sequence 101 in FIG. 1 presents an example of a compressed mode transmission. In sequence 101, the transmission of frames number N and N+2 lasts as long as the transmission of frames in the continuous transmission. The transmission of frames number N+1 and N+3 in sequence 101 lasts a shorter time than that of frames N and N+2 in the same sequence. The frames N+1 and N+3,whose transmission takes a shorter time, may carry a smaller amount of user data as frames N and N+2. It is also possible that all frames in compressed mode carry the same amount of user data.

Figure 2:
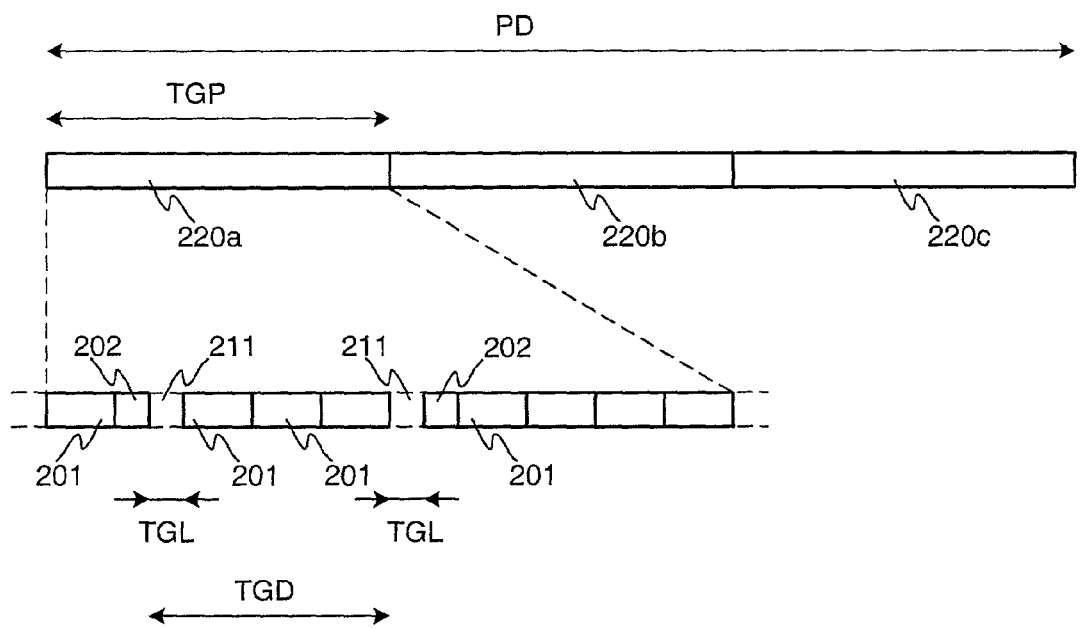

Usually the compressed mode transmission lasts many frames. FIG. 2 illustrates an example of periodically repeated transmission gaps 211 according to UTRA specification 3G TS 25.215, Physical layer measurements. The transmission gap length (TGL) is the duration of the transmission gaps 211. Usually TGL is expressed in numbers of time slots. According to 3G TS 25.215 specification, there are up to two transmission gaps within a transmission gap period (TGP). The repeated transmission gap periods are presented in FIG. 2 with rectangulars 220a, 220b and 220c. The transmission gaps within a transmission period are separated from each other by a transmission gap distance (TGD) . The duration of the transmission gap period is an integer number of frames, and the duration of the transmission gap distance is an integer number of time slots. During the compressed mode operation, the transmission gap period is repeated for a certain number of times, and the pattern duration (PD) is a multiple of the number of frames in one TGP.

A system frame number (SFN) is the parameter specifying the frame in which compressed mode transmission starts. The slot number (SN) specifies the time slot in which the first transmission gap within a transmission gap period starts. A cellular network can tell to a mobile station the frames where transmission gaps are by, for example, signaling the values for SFN, SN, PD, TGP, TGD and TGL to the mobile station. It is also possible to define the transmission gap pattern using other parameters, but this set of parameters, which complies with the 3G TS 25.215 specification, is used here as an example.

According to 3G TS 25.215 specification, within a transmission pattern two transmission gap periods having different durations can be repeated alternatingly. Parameter TGP1 defines the duration of the odd-numbered transmission gap periods, and parameter TGP2 defines the duration of the even-numbered transmission gap periods. All transmission gap periods are similar from the beginning of the transmission gap period to the end of the second transmission gap within a transmission gap period (or to the end of the only transmission gap, if there is only one transmission gap within each transmission gap period). The difference in the transmission gap periods having a first duration TGP1 and those having a second duration TGP2 is that in the end of the longer transmission periods there are more frames, which are similar to those transmitted during continuous operation. If only one value duration TGP of the transmission gap period is defined, then all transmission gap periods have this duration.

In a handover situation it is important that the mobile station can receive synchronization information from the target cell. In UTRA FDD, for example, the synchronization channel (SCH) is the logical channel that carries this information, and physically there are certain synchronization symbols in each time slot. The synchronization symbols of a frame indicate, in addition to the timing of the transmission, the long scrambling code group which the target cell is using for downlink transmissions. The long scrambling codes are grouped into a certain number of groups, and each group has a certain number of scrambling codes. For successfully receiving control information from the target cell, the mobile station has to find out the long scrambling code of that cell. The larger number of synchronization symbols which the mobile station can receive from the target cell, the larger the probability to successfully determine the long scrambling code.

The periodical compressed mode enables the determination of certain number of synchronization symbols. The length and position of the transmission gap defines the indexes of the time slots (in the target cell) whose synchronization symbols the mobile station can receive. It is advisable to choose the transmission gap distance so that the as many time slot indexes as possible are selected. The repetition of the transmission gap pattern allows the synchronization symbols to be received multiple times, and thus the value of the symbols can be determined more accurately than based just on receipt of the symbols.

When user data is transmitted over the radio interface, it is typically first coded (to increase redundancy and resistance to bit errors in transmission) and then interleaved (to increase resistance to bursty transmission errors). The coding and interleaving are usually done in the first protocol layer. There are at least three ways to create the transmission gaps. The first alternative is to limit the amount of user data delivered from the upper protocol layers to the first protocol layer. This approach does not work for delay-sensitive applications, such as real-time applications, where there is no time, for example, to buffer the data. A second alternative to create a transmission gap is to reduce the spreading factor used to spread the data of the communication connection according to the CDMA technique. Symbols carry an information stream whose rate is the chip rate divided by the spreading factor. Reducing the spreading factor by two means that the symbol rate of the information stream is doubled. This means that it is possible to carry the same amount of user data in half of the time slots. A third alternative to create a transmission gap is to puncture the coded data so that the rate of the coded data is less in the compressed mode than in the continuous transmission mode. Rate matching is usually performed between coding and interleaving. Rate matching means either repeating certain selected bits of the coded data or ignoring certain selected bits of the data, in order to produce a coded data flow having a certain rate. Puncturing refers to ignoring certain bits of the coded data. Using puncturing, it is possible to carry the same amount of user data in all frames, despite of the transmission gaps. There is a certain maximum duration of a transmission gap that is feasible to create using puncturing. If too much bits of the coded data are punctured, the quality of the transmission deteriorates drastically.

For data related to real-time applications, it is thus possible create transmission gaps by reducing the spreading factor or by puncturing the coded data. In general, the transmission power of the frames, during which the transmission gap occurs, needs to be increased to ensure the quality of the transmission, when puncturing or reduction of the spreading factor is used to create the transmission gaps.

Reducing the spreading factor by two means that the transmission gap length can be 7 time slots in a system where there are 15 time slots per frame. 3G TS 25.215 specification allows one or two transmission gaps of 7 time slots to be placed in isolation (i.e. one or two transmission gaps of 7 time slots within a transmission gap period), or two transmission gaps may be placed next to each other in two consequent frames within a transmission gap period. Using the latter double frame approach, it is thus possible to have within a transmission gap period one transmission gap of 14 time slots. The switching of the receiver from a frequency to another frequency and back may take a time of about one or two time slots. Table 1 presents the number of synchronization symbols, which are transmitted by the target cell and which the mobile station can capture, when transmission gaps are created by reducing the spreading factor by two.

TABLE 1

Number of captured synchronization symbols when transmission gaps are created by reducing the spreading factor by two.

| Transmission gap duration | Switching time | Number of captured synchronization symbols |
| --- | --- | --- |
| 7 time slots | 1 time slot | 2*(7 − 1) = 12 |
|  | 2 time slots | 2*(7 − 2) = 10 |
| 14 time slots | 1 time slot | 14 − 1 = 13 |
|  | 2 time slots | 14 − 2 = 12 |

In UTRA FDD, each cell has a primary scrambling code which is used as long as there are available channelization codes related to said primary scrambling code. The channelization codes are orthogonal and their spreading factor varies typically from 4 to 512 chips per user data bit. Each downlink communication connection is given a specific channelization code. The use of a channelization code having a small spreading factor prevents the use of a certain number of channelization codes having a larger spreading factor. When creating transmission gaps by reducing the spreading factor by two, there may occur a situation, where it is not possible to change a first channelization code to a second channelization code whose spreading factor is smaller, because there are not enough free channelization codes whose spreading factor is smaller. This situation is usually called code limited.

In a code limited situation it is possible to reduce the spreading factor by two by using a secondary scrambling code with the new channelization code; see TSGRI#7(99) b27, Ericsson: "Use of multiple scrambling codes in compressed mode" TSG-RAN Working Group 1 meeting 7, Hannover, Germany, Aug. 30–Sep. 3, 1999. The problem is using a secondary scrambling code is that the orthogonality of the channelization codes with a cell is lost. The interference caused by the transmission in the tow cell $P_{intra}$ is increased compared to the interference caused by the surrounding cell $P_{inter}$. The target value for the signal-to-interference (SIR) in the transmission power control has to be increased considerably to ensure the quality of the transmission. As can be seen in Table 2, the required increase in the target value for SIR depends on the ratio $P_{intra}/P_{inter}$ and on the channel impulse response profile, which defines the orthogonality factor for the primary scrambling code. When the own cell interference is about the same as the interference caused by surrounding cells, i.e. $P_{intra}/P_{inter}=0$ dB, the increase in the target SIR value is smaller that when $P_{intra}/P_{inter}$ is larger, i.e. when the mobile station is nearer the base station. A 3 dB increase in the target value for SIR is due to reduction of the spreading factor by two.

TABLE 2

Required increase in the target value of SIR when a secondary scrambling code is taken into use

|  | $P_{intra}/P_{inter}$ | Increase in target SIR |
|---|---|---|
| Indoor | 10 dB | 4.7 dB + 3 dB = 7.7 dB |
|  | 5 dB | 2.5 dB + 3 dB = 5.5 dB |
|  | 0 dB | 0.9 dB + 3 dB = 3.9 dB |
| Vehicular | 10 dB | 3.7 dB + 3 dB = 6.7 dB |
|  | 5 dB | 2.7 dB + 3 dB = 5.7 dB |
|  | 0 dB | 1.6 dB + 3 dB = 4.6 dB |

Creating transmission gaps by reducing the spreading factor by two may thus cause many problems in a code limited situation. Firstly, the transmission power of certain frames during the compressed mode transmission has to be increased, and it has to be increased typically more than 4 dB. This causes more interference to the other transmissions in the cell. In addition, in a code limited situation the base station cannot necessarily increase the transmission power of the compressed mode transmission as much as required because of all the other active communication connections. Secondly, a required increase for the target value of SIR needs to be estimated. This is difficult, because the increase in SIR depends on the position and velocity of the mobile station and because it is not possible to measure the ratio $P_{intra}/P_{inter}$. If the increase in SIR is always chosen to be large enough, for example 7.7 dB, to ensure a successful interfrequency handover, then unnecessary interference is caused at least in some cases.

It is possible to use puncturing for creating transmission gaps. The transmission power of the frames which contain the transmission gaps needs to be increases also in this case. The 3G TS 25.215 specification allows transmission gaps whose length is 7 time slots for interfrequency handover. It is not feasible to create this long transmission gaps using puncturing, because the quality of transmitted data deteriorates. Table 3 presents the estimated increase in the target SIR when puncturing is used to create transmission gaps, whose length is 5 time slots. Compressed transmission in 10 time slots instead of 15 time slots causes a 1.7 dB increase to the target values of SIR.

TABLE 3

Required increase in the target value of SIR when puncturing is used

|  | $P_{intra}/P_{inter}$ | Coding | Increase in target SIR |
|---|---|---|---|
| Pedestrian | 6 dB | Convolutional | 1.0 dB + 1.7 dB = 2.7 dB |
|  | 6 dB | Turbo | 0.5 dB + 1.7 dB = 2.2 dB |
| Vehicular | 6 dB | Convolutional | 2.0 dB + 1.7 dB = 3.7 dB |
|  | 6 dB | Turbo | 1.5 dB + 1.7 dB = 3.2 dB |

When puncturing is used, the compressed transmission may use the primary scrambling code. The interference cause by the own cell is roughly the same thoughout the cell, and therefore only one value for the ratio $P_{intra}/P_{inter}$ is shown in Table 3. The increase in the target value of SIR is less than when the spreading factor is reduced. The increase in the target value of SIR depends on the channel model and on the velocity of the mobile station, but even if the largest value for the increase in Table 3 is 3.7 dB. If turbo coding, which is less sensitive to puncturing and/or transmission errors than convolutional coding, is used in the compressed transmission, even a smaller increase in target SIR is enough.

In a code limited situation using puncturing to create transmission gaps causes a smaller increase in transmission power than reducing the spreading factor. The problem in puncturing is that it is not possible to capture enough synchronization symbols on the second frequency. Table 4 shows the number of captured synchronization symbols. At maximum 9 synchronization symbols can be captured using the double frame method. This provides a much smaller probability for determining the scrambling code group, and further a smaller probability for carrying out a successful handover, than the 12 synchronization symbols that can be determined when transmission gaps are created by reducing the spreading factor by two (see Table 1). Thus, although puncturing is preferred over reduction of spreading factor from the view-point of transmission power, its use in not feasible.

TABLE 4

Number of captured synchronization symbols when transmission gaps are created by puncturing.

| Transmission gap duration | Switching time | Number of captured synchronization symbols |
|---|---|---|
| 5 time slots | 1 time slot | 2*(5 − 1) = 8 |
|  | 2 time slots | 2*(5 − 2) = 6 |
| 10 time slots | 1 time slot | 10 − 1 = 9 |
|  | 2 time slots | 10 − 2 = 8 |

The object of the invention is to present a flexible method for preparing an interfrequency handover. A further object of the invention is to present a method using which an adequate number of synchronization symbols can be captured when the transmission gaps are created by puncturing. Even a further object of the invention is to present a method, which can be supported in the existing systems with small modifications.

The objects of the invention are achieved by letting the transmission gaps have different durations during an interfrequency handover.

BRIEF SUMMARY OF THE INVENTION

A method according to the invention is a method for preparing an interfrequency handover of a certain communication connection from a first frequency to a second frequency. It comprises the following steps of
periodically intermitting the transmission/receipt of data on the first frequency for certain transmission gaps, where the number of transmission gaps is at least one during each transmission period, a certain sequence of transmission periods is used, and at least one transmission period has a transmission gap having a first duration and a second transmission gap having a second duration, which second duration is different from the first duration, and performing measurements on the second frequency during the transmission gaps on the first frequency.

In a method according to the invention, measurements are performed for or during an interfrequency handover. The transmission and/or receipt of data on a first frequency is intermitted periodically by repeating certain transmission periods, where there is at least one transmission gap in each transmission period. In a method according to the invention, the transmission/receipt of data is intermitted according to a certain sequence of transmission periods. The different transmission periods may, for example, be repeated cyclically. For example, if there are three different transmission periods A, B and C, the repetition order may be A, B, C, A, B, C, A, B, C, A, . . . It is also possible that in a method according to the invention all transmission periods are different.

During the transmission/receipt gaps a mobile station, for example, performs measurement on a second frequency. The method according to the invention is characterized in that in at least one transmission period comrpises two transmission gaps having different durations. There can be, for example, two transmission gaps, one longer and one shorter, in one transmission period. It is also possible that within one transmission period, for example, each transmission gap has a specific duration or that all transmission gaps except one have the same duration.

It is also possible that all subsequent transmission periods have the same number of transmission gaps, and the transmission periods are similar from the beginning of the first transmission gap within a transmission period to the end of the last transmission gap within the transmission period. In this case, in the end of longer transmission periods, transmission is typically carried out similarly as during continuous mode transmission. In a method according to the invention, the number of different cyclically repeated transmission periods is at least one.

In a method according to the invention, the method used for creating the transmission gaps is not restricted. Any method using which transmission gaps are created in prior art methods is applicable. Typically the data to be transmitted is coded before transmission, and puncturing the coded data, i.e. ignoring certain bits of the coded data, is one way to create the transmission gaps. When using puncturing, a longer transmission gap is preferably placed to overlap two frames and a shorter transmission gap is placed within a frame. This way an adequate number of synchronization symbols can be captured while having a tolerable increase in transmission power. This is one of the advantages of the method according to the invention. Further advantages are discussed in connection with the preferred embodiments of the invention.

The invention relates also to a mobile station, which comprises means for receiving data on a first frequency, means for intermitting periodically the receipt of data on the first frequency during certain transmission gaps, where the number of transmission gaps is at least one during each transmission period, a certain sequence of transmission periods is used, and at least one transmission period has a transmission gap having a first duration and a second transmission gap having a second duration, where the first duration is different from the second duration, means for receiving information about the durations of at least two transmission gaps, and means for performing measurements on a second frequency during the transmission gaps.

A network element according to the invention is a network element, which comprises means for transmitting data on a certain frequency and means for intermitting periodically the transmission of data related to a certain communication connection during certain transmission gaps, where the number of transmission gaps is at least one during each transmission period, a certain sequence of transmission periods is used, and at least one transmission period has a transmission gap having a first duration and a second transmission gap having a second duration, where the first duration is different from the second duration, and means for receiving information about the duration of at least two transmission gaps within one transmission period.

The invention relates further to a network control element, which comprises means for defining a certain sequence of transmission periods, where the number of transmission gaps is at least one during each transmission period, means for deciding a first duration for at least a certain transmission gap and a second duration of a second transmission gap, where the first duration is different from the second duration and said transmission gaps are within at least one transmission period, means for transmitting information about the transmission periods, and means for transmitting information about the duration of at least two transmission gaps within one transmission period.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE SEVERAL VIEWS OF THE DRAWING(S)

Figure 3:
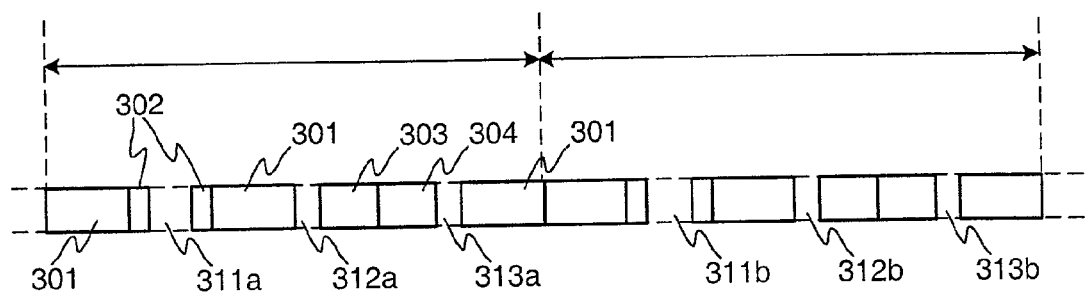
Figure 4:
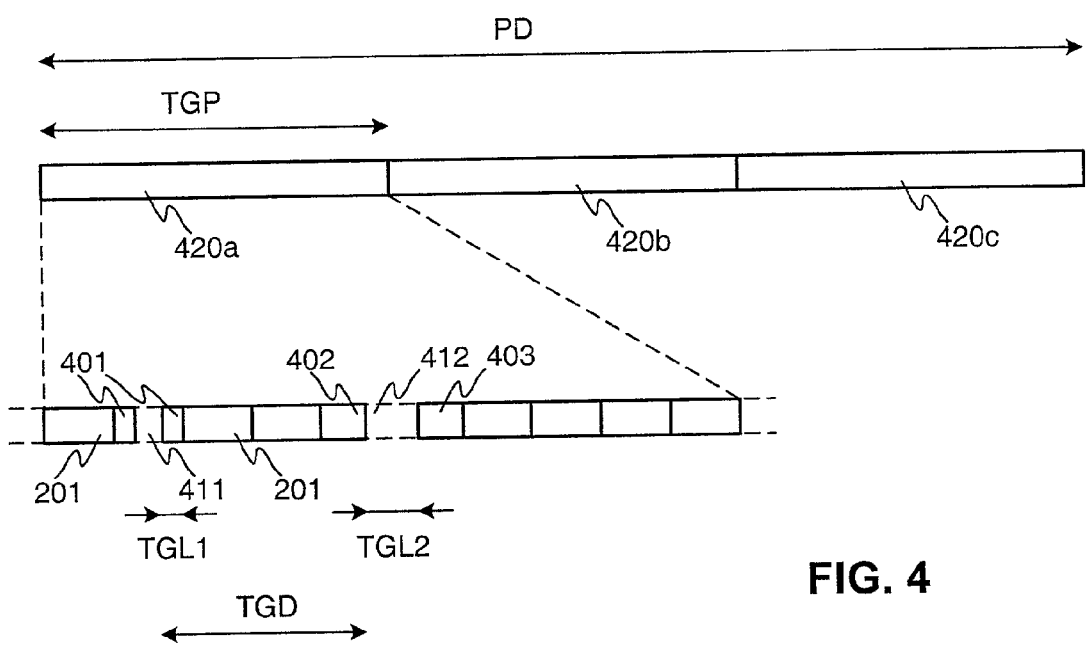
Figure 5:
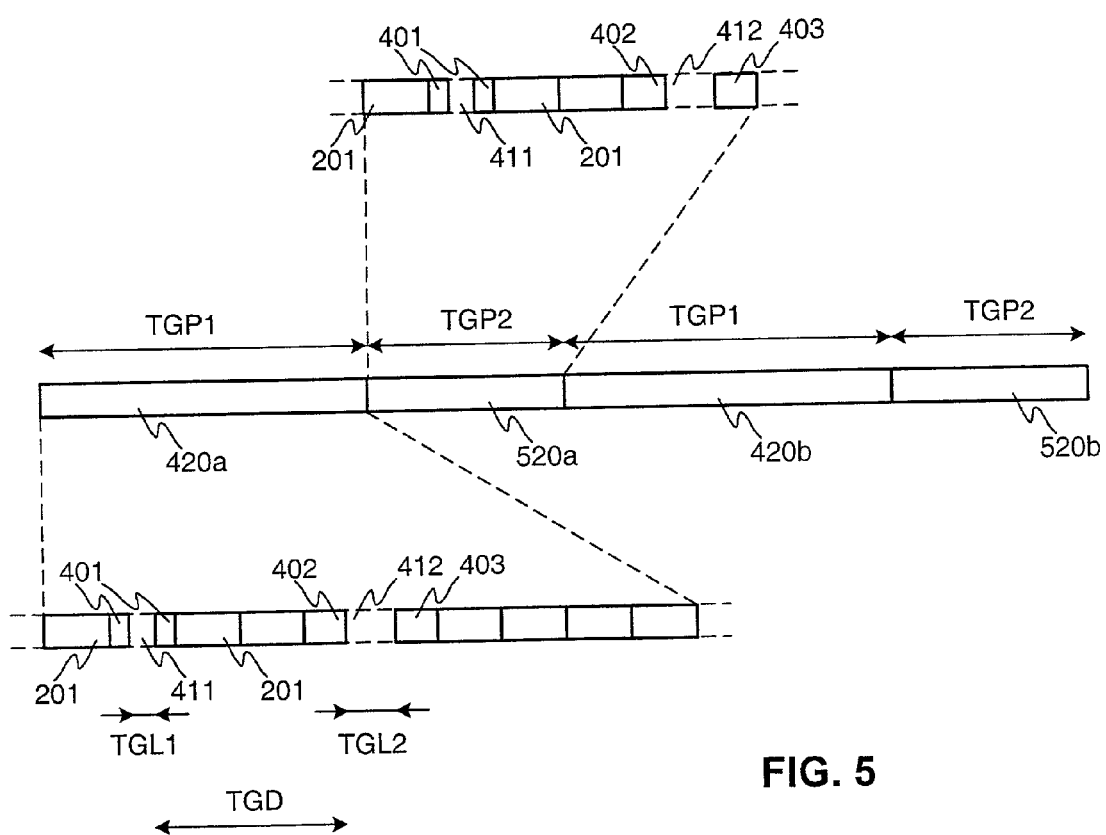
Figure 6:
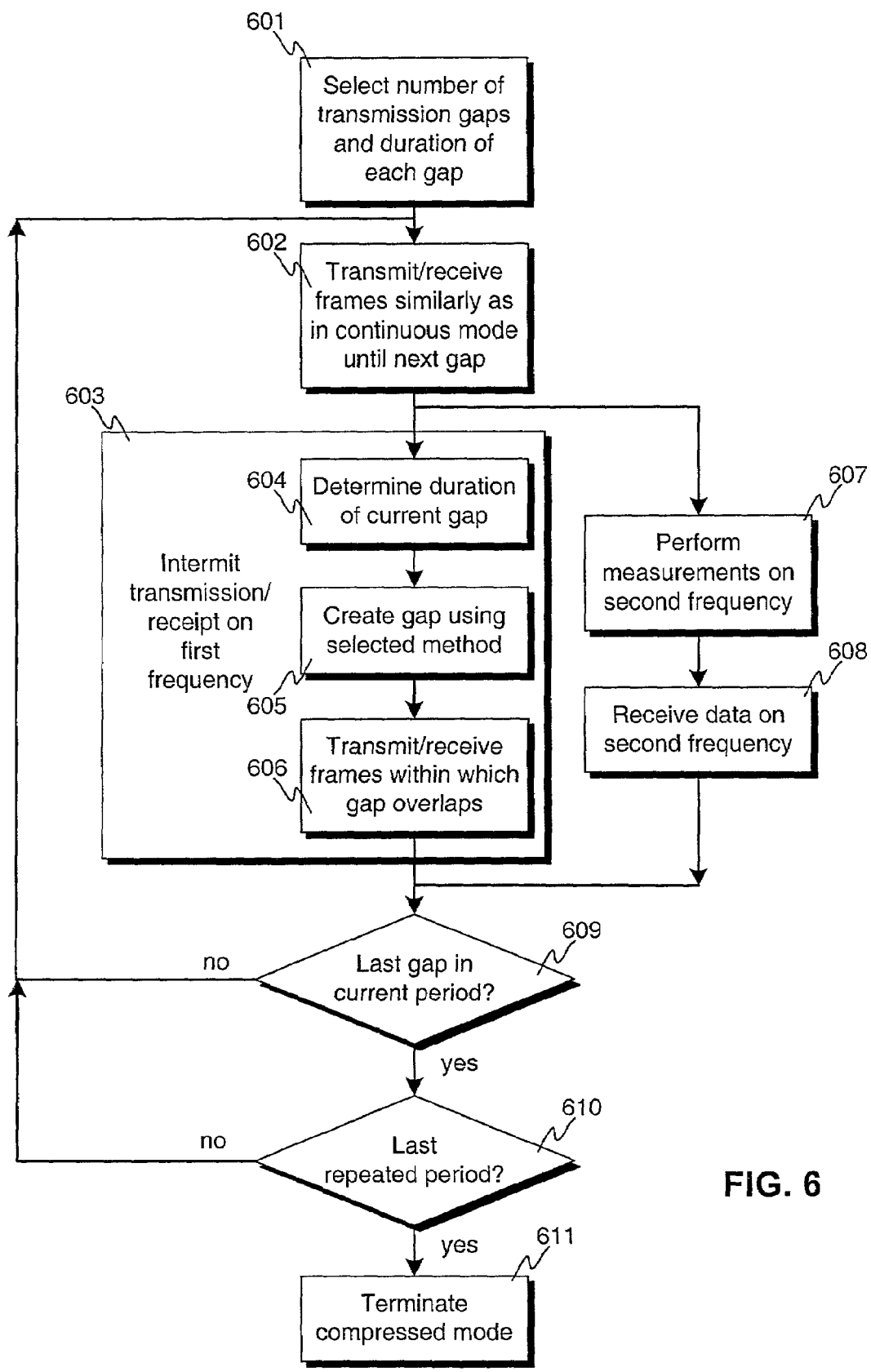
Figure 7:
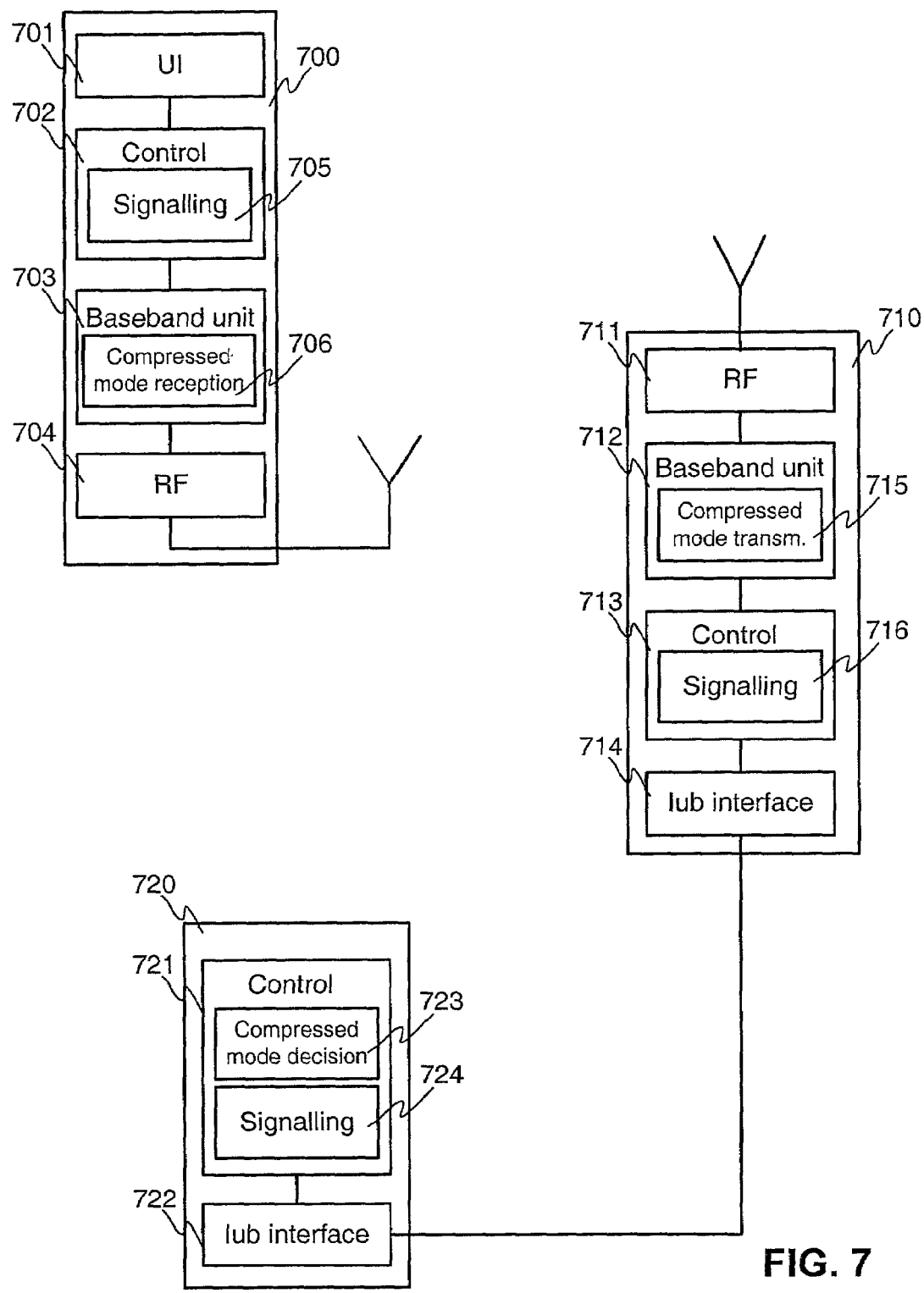

FIG. 1 illustrates the known concept of compressed mode,

FIG. 2 illustrates a known way to specify the positions of transmission gaps during compressed mode, FIG. 3 illustrates a transmission period according to a first preferred embodiment of the invention, FIG. 4 illustrates a transmission gap pattern according to a second preferred embodiment of the invention, FIG. 5 illustrates a transmission gap pattern according to a third preferred embodiment of the invention, FIG. 6 illustrates a flowchart of a method according to the invention, and FIG. 7 presents two network elements and a mobile station according to the invention.

DETAILED DESCRIPTION OF THE INVENTION

FIGS. 1 and 2 have been treated in the description of prior art, so the following description of the embodiments of the invention will focus on FIGS. 3–7. Same reference designators in the drawings relate to similar parts.

FIG. 3 illustrates an example of a compressed mode transmission according to the first preferred embodiment of the invention, where a certain transmission period is repeated. The repeated period is marked with arrows in FIG. 3. The transmission period comprises three transmission gaps 311, 312 and 313. The transmission gap 311 is longer than the transmission gaps 312 and 313, which in FIG. 3 have the same duration by the way of example. The frames 301 are similar frames as the frames sent during continuous transmission mode. The transmission gap 311 is in the middle of a frame, covering the time slots in the middle of a frame. Data related to frame 302 is transmitted in the first time slots of a frame and in the last time slots of a frame. The transmission gap 312 covers a certain number of the first time slots of a frame, and the transmission gap 313 covers a certain number of the last time slots of a frame. Data related to frame 303 is sent in the end of a frame, and data related to frame 304 is sent in the beginning of a frame.

It is preferable to select the durations of the transmission gaps and the distances of the transmission gaps within a transmission period so that the transmission/receipt is intermitted during different time slots in each transmission gap. This way as many different synchronization symbols as possible can be captured on another frequency. If possible, the transmission gaps should cover all time slots in a frame. A preferred number of transmission gaps within a transmission period and the preferred durations of the transmission gaps depends, for example, on the method which is used to create the transmission gaps. The transmission gaps can be created, for example, by puncturing coded data, by reducing the spreading factor or by transmitting less data in the frames which overlap the transmission gaps in time.

FIG. 4 illustrates an example of a transmission period according to a second preferred embodiment of the invention. In a method according to the second preferred embodiment of the invention, there are two transmission gaps 411 and 412 within a transmission period 420 and the transmission gaps are created by puncturing coded data. The transmission period is here called the transmission gap period, which is the term used in 3G TS 25.215 specification. In a method according to the second preferred embodiment, the shorter transmission gap 411 is placed in the middle of the frame 401 and the longer transmission gap 412 is overlapping two frames 402 and 403.

The transmission gap pattern presented in FIG. 4 can be defined using, for example, the following parameters: duration of the first transmission gap (TGL1), duration of the second transmission gap (TGL2), distance between the transmission gaps (TGD), duration of the transmission gap period (TGP), duration of the transmission gap pattern (PD), the number of the frame in which the first transmission gap starts (SFN) and the number of the time slot in which the first transmission gap starts (SN). When compared to the 3G TS 25.215 specification, only a parameter defining the duration of the other transmission gap (TGL2) has to be added to the parameter list defined there. Only one additional parameter needs to be signaled between the network elements in the cellular network and from the cellular network to a mobile station. A method according to the second preferred embodiment of the invention can thus be supported with small changes in the existing system.

When puncturing is used, about one third of the coded data bits can be ignored without a drastic deterioration of the quality of the transmission. In UTRA FDD system, where there are 15 time slots per frame, the maximum feasible length of a transmission gap is thus 5 time slots. In a method according to the second preferred embodiment, the duration of the shorter transmission gap, which is within a frame, is thus preferably 5 time slots in UTRA FDD system. The maximum feasible length for the longer time slot, which overlaps two sequential frames, is 10 time slots in UTRA FDD system. The switching time from one frequency to another and back is either one or two time slots. Table 5 summarizes the maximum numbers of synchronization symbols a mobile station can capture from a neighboring cell during an interfrequency handover when a method according to the second preferred embodiment is employed.

TABLE 5

Number of captured synchronization symbols when a method according to the second preferred embodiment of the invention is used.

| Transmission gap duration | Switching time | Number of captured synchronization symbols |
|---|---|---|
| 5 + 10 time slots | 1 time slot | (5 − 1) + (10 − 1) = 13 |
| | 2 time slots | (5 − 2) + (10 − 2) = 11 |

The numbers of captured synchronization symbols in Table 5 can be compared to the numbers of captured synchronization symbols presented in Table 1. Using a method according to the second preferred embodiment of the invention, it is possible to capture more synchronization symbols than when the spreading factor is reduced by two and the transmission gap length is 7 time slots. When compared to one transmission gap of 14 time slots, either the same amount of synchronization symbols (switching time is one time slot) or one less (switching time is two time slots) is captured. Even in the latter alternative, 11 synchronization symbols can be captured. This is enough for performing an interfrequency handover.

In addition, in a code limited situation, when a secondary scrambling code may need to be taken into use, a method according to the second preferred embodiment of the invention requires smaller increase in the transmission power, when puncturing is used to create the transmission gaps. The method according to the second preferred embodiment of the invention is thus very suitable for handovers in code limited situations.

FIG. 5 illustrates the beginning of a transmission gap pattern according to a third preferred embodiment of the invention. In FIG. 5, two transmission gap periods 420 and 520 are repeated alternatingly. The transmission gaps 411 and 412 are at the same positions, counting from the beginning of the transmission period, in transmission gap periods 420 and 520. In FIG. 5, the transmission gap period 520 is four frames shorter than transmission gap period 420.

As discussed above, it is also possible that some of the cyclically repeated transmission periods comprise only one transmission gap or that the transmission gaps in some of the transmission gap periods have equal durations.

FIG. 6 presents a flowchart of a method according to the invention. This method illustrates, how in a certain communication connection data is transmitted in compressed mode. In step 601 the transmission gap periods, the order for their cyclical repetition and, especially, the number of the transmission gaps within each transmission gap period and the duration of each gap are defined. Typically, in a handover these are defined by the network and the information is then usually signaled to a mobile station. This way the mobile station can receive properly the information transmitted in compressed mode.

In compressed mode the steps 602–610 are repeated. In step 602 information related to the communication connection is transmitted/received in frames similarly as during continuous mode operation. This is done until the first transmission gap of the first transmission gap period is reached. Thereafter in step 603 the transmission/receipt of information of the communication connection is intermitted. In step 604 the duration of the transmission gap is determined, and in step 605 the transmission gap is created with a selected method, for example, using puncturing or by reducing the spreading factor by two. In step 606, the frames which overlap with the transmission gap are transmitted/received. The transmission power of these frames is typically larger than the transmission power of the frames transmitted in step 602.

When the transmission gap is passed, in step 609 it is checked, if the current transmission gap is the last in the current transmission gap period. If it is not, then frames are in step 602 again transmitted/received similarly as in continuous mode operation, until the next transmission gap within the current transmission gap period is reached. If the transmission gap is the last one within the current transmission gap period, then in step 610 it is checked if the current transmission gap period is the last in the compressed mode. If the compressed mode still continues, then again frames are transmitted/received similarly as in continuous mode, until the first transmission gap in the next transmission gap period is reached (step 602). If the transmission gap period(s) is (are) already repeated as many times as specified when entering the compressed mode operation, then the compressed mode transmission is terminated in step 611.

During the transmission gaps on the first frequency, it is possible to perform measurements on a second frequency (step 607). Further, data can be received on the second frequency (step 608). The data may be, for example, the synchronization symbols of a neighboring cell.

FIG. 7 presents examples of a mobile station 700 and two network elements 710, 720 according to the invention. A method according to any of the preferred embodiments of the invention, for example, may be implemented in the mobile station 700, in the network element 710 and in the network control element 720.

The mobile station 700 comprises a user interface (UI) 701, a control unit 702, a baseband unit 703 and a radio frequency (RF) unit 704. The RF unit is a receiver/transmitter that handles frequency separation, possible frequency conversion to/from intermediate frequencies or to baseband, and analog/digital conversion. The baseband unit is responsible of the physical (first) layer processing, such as the channel coding, interleaving and multiplexing. It may be implemented using hardware (typically ASICs), software (typically digital signal processing DSP), or both. The baseband unit may also implement part or all of the layer 2 radio protocols. Layer 3 protocols and possible also part of layer 2 protocols are implemented in the control unit.

For the mobile station 700 to be able to operate during a handover where a method according to the invention is used, the compressed mode reception block 706 in baseband unit 703 may have to be modified. The modification is related, first, to receiving compressed data on a first frequency and, secondly, to determining the synchronization symbols from data received on a second frequency. The signaling unit 705 in the control unit 702 may also need modification. For example, the signaling unit needs to understand a signaling message where more than one duration of a transmission gap within a transmission gap periods defined.

Term mobile terminal refers here to a wireless terminal of a cellular system. It may be a portable terminal, which a person may carry, or a wireless terminal installed in some other equipment. For example, in UMTS a mobile terminal is usually called User Equipment (UE).

The network element 710 is the network element with which the mobile station has a communication connection over the radio interface. It is thus usually called a base station, but in UTRA it is also called a node-B. This network element has the radio frequency (RF) unit 711, a baseband unit 712, a control unit 713 and an interface unit 714, via which communication with rest of the cellular network occurs. In order to support the compressed mode transmission according to the invention, the signaling unit 716 in the control unit needs to understand signaling, where more than one duration of a transmission gap within a transmission gap period is defined. Further, the compressed mode transmission unit 715 has to be able to create the transmission gaps of various durations within a transmission gap period.

The network control element 720 is the network element which is responsible, for example, for the control and allocation of radio resources in the cellular network. This control element decides, for example, when a certain communication connection enters compressed mode transmission and the transmission gap pattern used in said compressed mode transmission. Therefore, in order to support a method according to the invention, the control unit 712 of the network control element may have to be modified to be able to make compressed mode decisions according to the invention. The modifications are presented in FIG. 6 with the compressed mode decision unit 723. Further, the network control element 720 typically signals information about the transmission gap pattern both to a base station and to a mobile station. Therefore the signaling unit 724 has to implement signaling which supports methods according to the invention.

The network control element 720 comprises also an interface unit 722 via which it communicates with the network element 710. Further, it may comprise various units related to the multiplexing of connections and routing of information in the radio access network.

The network control element 720 may be, for example, the radio network controller (RNC) of a UTRA. It is also possible that the decision about the transmission gap period and transmission gap durations in done in the same network element which transmits the data over the radio interface.

In this description a transmission pattern during a compressed mode transmission is defined using the following parameters: the duration of each transmission gap within transmission periods, the distance between two consequent transmission gaps within a transmission period, the duration(s) of the transmission period(s), the duration of the transmission pattern, and the numbers of the frame and of the time slot where the first transmission gap of the first transmission period starts. This set of parameters is used as an example, and the method according to the invention is not restricted to methods, where the positions of transmission gaps during a compressed mode operation is defined using these parameters. The names of the parameters may be different, or the positions of transmission gaps during a compressed mode operation may be defined using other parameters. The invention applies to all methods where certain transmission gaps are periodically repeated during the compressed mode operation.

Further, the method according to the invention is applicable to any cellular system employing CDMA technique for multiplexing communication connections. The UTRA FDD system is presented as an example of such systems.

The invention claimed is:

1. A method for preparing an interfrequency handover of a certain communication connection from a first frequency to a second frequency, said method comprising:
periodically intermitting the transmission/receipt of data on the first frequency for certain transmission gaps, where the number of transmission gaps is at least one during each transmission period, a certain sequence of transmission periods is used, and at least one transmission period has a transmission gap having a first duration and a second transmission gap having a second duration, which second duration is different from the first duration,
performing measurements on the second frequency during the transmission gaps on the first frequency,
coding original data before transmission,
transmitting coded data, in a first frame, during which the transmission is continuous,
and wherein the step of intermitting the transmission/receipt of data comprises transmitting coded data in a second frame, during which the transmission/receipt of coded data is intermitted.

2. A method according to claim 1, comprising further receiving system information on the second frequency during a transmission gap on the first frequency.

3. A method according to claim 1, wherein the step of intermitting the transmission/receipt of data, all the transmission periods are identical from the beginning of the first transmission gap within a transmission period to the end of the last transmission gap within the same transmission period.

4. A method according to claim 1, wherein the step of intermitting the transmission/receipt of data, a certain number of transmission periods is repeated cyclically.

5. A method according to claim 1, wherein the amount of coded data transmitted in the first frames and in the second frames corresponds to a fixed amount of original data.

6. A method according to claim 5, wherein the step of intermitting the transmission/receipt of data further comprises the puncturing the coded data transmitted in the second frames, so that the amount of transmitted coded data in the first frames and in the second frames corresponds to said fixed amount of original data.

7. A method according to claim 1, wherein:
the frames comprise a certain number of time slots,
the step of intermitting the transmission/receipt of data, transmission/receipt is intermitted during said transmission gap having the first duration during certain first time slots of a frame and during said transmission gap having the second duration during certain second time slots of a frame, which second time slots are not the same time slots as the first time slots.

8. A method according to claim 7, wherein the step of intermitting the transmission/receipt of data, said transmission gap having said first duration occurs during two sequential frames and said transmission gap having said second duration occurs within one frame.

9. A method according to claim 8, wherein the second duration is shorter than the first duration.

10. A method according to claim 9, wherein the first duration is substantially twice the second duration.

11. A method according to claim 10, wherein substantially half of the transmission gap having the first duration occurs during in the previous frame at the end of the first frame and at the beginning of the second frame of said two subsequent frames.

12. A method according to claim 11, comprising further:
coding original data before transmission, and
transmitting coded data in first frames, during which the transmission is continuous,
and wherein the step of intermitting the transmission/receipt of data comprises transmitting coded data in second frames, during which the transmission/receipt of coded data is intermitted, and
before transmission, puncturing the coded data transmitted in the second frames, so that the amount of transmitted coded data in the first frames and in the second frames corresponds to a fixed amount of original data.

13. A method according to claim 1, comprising further:
deciding the number of transmission gaps within each transmission period,
deciding the duration of each transmission period,
deciding the duration of each transmission gap,
deciding the durations between the transmission gaps, and
transmitting information about the duration of each transmission gap and the durations between the transmission gaps from a cellular network to a mobile station.

14. A method according to claim 1, wherein there are two transmission periods having different durations.

15. A method according to claim 1, wherein all transmission periods have the same duration.

16. A mobile station comprising:
means for receiving data on a first frequency,
means for intermitting periodically the receipt of data on the first frequency during certain transmission gaps, where the number of transmission gaps is at least one during each transmission period, a certain sequence of transmission periods is used, and at least one transmission period has a transmission gap having a first duration and a second transmission gap having a second duration, the first duration being different from the second duration,
means for receiving information about the durations of at least two transmission gaps,
means for performing measurements on a second frequency during the transmission gaps,
means for coding original data before transmission,
means for transmitting coded data, in a first frame, during which the transmission is continuous,
and wherein the means of intermitting the transmission/receipt of data comprises means for transmitting coded data in a second frame, during which the transmission/receipt of coded data is intermitted.

17. A mobile station according to claim 16, comprising further
means for receiving system information an a second frequency during the transmission gaps on the first frequency, and
means for determining a scrambling code group using the received system information.

18. A mobile station according to claim 17, wherein it is a UMTS mobile station.

19. A network element comprising:
means for transmitting data on a certain frequency,
means for intermitting periodically the transmission of data related to a certain communication connection during certain transmission gaps, where the number of transmission gaps is at least one during each transmission period, a certain sequence of transmission periods is used, and at least one transmission period has a first transmission gap having a first duration and a second transmission gap having a second duration, where the first duration is different from the second duration, means for receiving information about the duration of at least two transmission gaps within one transmission period,
means for coding original data before transmission,
means for transmitting coded data, in a first frame, during which the transmission is continuous,
and wherein the means of intermitting the transmission/receipt of data comprises means for transmitting coded data in a second frame, during which the transmission/receipt of coded data is intermitted.

20. A network element according to claim 19, wherein it is a base station of the UTRA network.

21. A network control element comprising:
means for defining a certain sequence of transmission periods, where the number of transmission gaps is at least one during each transmission period,
means for deciding a first duration for at least a certain transmission gap and a second duration of a second transmission gap, where the first duration is different from the second duration and said transmission gaps are within at least one transmission period,
means for transmitting information about the transmission periods,
means for transmitting information about the duration of at least two transmission gaps within one transmission period,
means for coding original data before transmission,
means for transmitting coded data, in a first frame, during which the transmission is continuous,
and wherein the means of intermitting the transmission/receipt of data comprises means for transmitting coded data in a second frame, during which the transmission/receipt of coded data is intermitted.

22. A network element according to claim 21, wherein it is a radio network controller of the UTRA network.

23. A system for preparing an interfrequency handover of a certain communication connection from a first frequency to a second frequency, said system comprising:
means for periodically intermitting the transmission/receipt of data on the first frequency for certain transmission gaps, where the number of transmission gaps is at least one during each transmission period, a certain sequence of transmission periods is used, and at least one transmission period has a transmission gap having a first duration and a second transmission gap having a second duration, which second duration is different from the first duration,
means for performing measurements on the second frequency during the transmission gaps on the first frequency,
means for coding original data before transmission,
means for transmitting coded data in a first frame, during which the transmission in continuous,
and wherein the means of intermitting the transmission/receipt of data comprises means for coded data in a second frame, during which the transmission/receipt of coded data is intermitted.

* * * * *